United States Patent [19]

Golden et al.

[11] Patent Number: 5,656,064

[45] Date of Patent: Aug. 12, 1997

[54] BASE TREATED ALUMINA IN PRESSURE SWING ADSORPTION

[75] Inventors: Timothy Christopher Golden; Fred William Taylor, both of Allentown; Andrew Wilson Wang, Alburtis, all of Pa.; Mohammed Ali Kalbassi, Surrey, England

[73] Assignee: Air Products and Chemicals, Inc., Allentown, Pa.

[21] Appl. No.: 538,876

[22] Filed: Oct. 4, 1995

[51] Int. Cl.$^6$ ............................................. B01D 53/047
[52] U.S. Cl. ........................... 95/96; 95/97; 95/104; 95/139; 95/900
[58] Field of Search ........................ 95/96–98, 104, 95/105, 139; 423/230, 231

[56] References Cited

U.S. PATENT DOCUMENTS

| | | | |
|---|---|---|---|
| 3,141,729 | 7/1964 | Clarke et al. | 95/139 X |
| 3,232,028 | 2/1966 | McDonald et al. | 95/139 |
| 3,557,025 | 1/1971 | Emerson et al. | 252/463 |
| 3,627,478 | 12/1971 | Tepper | 423/230 |
| 3,865,924 | 2/1975 | Gidaspow et al. | 423/230 |
| 4,233,038 | 11/1980 | Tao | 95/139 X |
| 4,249,915 | 2/1981 | Sircar et al. | 55/26 |
| 4,264,340 | 4/1981 | Sircar et al. | 95/139 X |
| 4,433,981 | 2/1984 | Slaugh et al. | 55/59 |
| 4,477,264 | 10/1984 | Kratz et al. | 55/25 |
| 4,477,267 | 10/1984 | Reiss | 95/139 |
| 4,493,715 | 1/1985 | Hogan et al. | 55/68 |
| 4,711,645 | 12/1987 | Kumar | 95/139 X |
| 4,795,735 | 1/1989 | Liu et al. | 95/139 X |
| 4,888,157 | 12/1989 | Carnell et al. | 423/230 |
| 4,937,059 | 6/1990 | Kolts et al. | 423/230 |
| 5,030,610 | 7/1991 | Sakata et al. | 95/139 X |
| 5,186,727 | 2/1993 | Chang | 95/139 X |
| 5,232,474 | 8/1993 | Jain | 55/26 |
| 5,480,625 | 1/1996 | Nalette et al. | 95/139 X |

FOREIGN PATENT DOCUMENTS

| | | | |
|---|---|---|---|
| 0111911 | 6/1984 | European Pat. Off. | 95/139 |
| 61-157322 | 7/1986 | Japan | 95/139 |
| 63-107720 | 5/1988 | Japan | 95/139 |
| 2-075318 | 3/1990 | Japan | 95/139 |
| 4-200742 | 7/1992 | Japan | 423/230 |
| 5-049918 | 3/1993 | Japan | 423/230 |

*Primary Examiner*—Robert Spitzer
*Attorney, Agent, or Firm*—Geoffrey L. Chase

[57] ABSTRACT

Pressure swing adsorption to remove $CO_2$ from a gas stream is conducted using an improved alumina obtained by impregnating a starting alumina with a basic solution having a pH of at least 9, e.g. of a basic compound such as $KHCO_3$, and drying at a temperature low enough to avoid decomposing the basic compound to a form which adsorbs $CO_2$ such that the compound does not regenerate under reduced pressure purging.

10 Claims, No Drawings

BASE TREATED ALUMINA IN PRESSURE SWING ADSORPTION

TECHNICAL FIELD OF THE INVENTION

The invention relates to the field of pressure swing adsorption (PSA) and provides PSA processes for the removal of carbon dioxide from a gas using improved alumina adsorbents.

DESCRIPTION OF THE PRIOR ART

Before air can be introduced into a cryogenic air separation process in which oxygen and nitrogen are separated from one another, it is necessary to remove carbon dioxide present in the air at low levels, e.g. 400 ppm. If this is not done, the carbon dioxide will solidify in the air separation plant. Two methods generally used for such carbon dioxide removal are temperature swing adsorption (TSA) and pressure swing adsorption.

In each of these techniques, a bed of adsorbent is exposed to a flow of feed air for a period to adsorb carbon dioxide from the air. Thereafter, the flow of feed air is shut off from the adsorbent bed and the adsorbent is exposed to a flow of purge gas which strips the adsorbed carbon dioxide from the adsorbent and regenerates it for further use. In TSA, the carbon dioxide is driven off from the adsorbent by heating the adsorbent in the regeneration phase. In PSA, the pressure of the purge gas is lower than that of the feed gas and the change in pressure is used to remove the carbon dioxide from the adsorbent.

Other components can be removed from the feed air by these processes, including hydrocarbons and water. These adsorption techniques can also be applied to feed gases other than air or to air to be purified for purposes other than use in an air separation plant.

The use of PSA for removing carbon dioxide from air prior to cryogenic air separation is described in numerous publications, e.g. U.S. Pat. No. 4,249,915 and U.S. Pat. No. 4,477,264. Initially, the practice was to use a dual bed of alumina for water removal followed by a zeolite such as 13X for carbon dioxide removal. More recently, all alumina PSA systems have been proposed, as described in U.S. Pat. No. 5,232,474. The advantages of an all alumina system include lower adsorbent cost, vessel design which does not need screens to separate the two different adsorbents and better thermal stability in the adsorption vessel during blow down and repressurization. It would be desirable however to develop adsorbents having an improved carbon dioxide capacity so as to allow smaller bed sizes with lower capital costs and less void gas being lost during depressurization, ie. higher air recoveries.

Alumina is also used as an adsorbent in TSA and for this purpose it has been proposed to treat the alumina to form alkali metal oxides thereon to increase the adsorptive capacity of the alumina. By way of example U.S. Pat. No. 4,493,715 teaches a method for removing $CO_2$ from olefin streams by contacting the feed gas with a regenerable, calcined adsorbent consisting of essentially from 1 to 6 wt % of an alkali metal oxide selected from the group consisting of sodium, potassium and lithium on alumina. The adsorbent was prepared by contacting alumina with an alkali metal compound which is convertible to the metal oxide on calcination.

U.S. Pat. No. 4,433,981 describes a process for removing $CO_2$ from a gaseous stream which comprises contacting the gas stream at a temperature up to about 300° C. with an adsorbent prepared by impregnation of a porous alumina with a sodium or potassium oxide. The corresponding oxide can be prepared by impregnation with a decomposable salt and calcining at a temperature of 350° to 850° C. Salts mentioned include alkali metal bicarbonates.

U.S. Pat. No. 3,557,025 teaches a method to produce alkalized alumina capable of adsorbing $SO_2$ by selectively calcining the alumina, and contacting with an alkali or ammonium bicarbonate salt to form at least 30% by weight alkalized alumina having the empirical formula of $MAl(OH)_2CO_3$.

U.S. Pat. No. 3,865,924 describes the use of a finely ground mixture of potassium carbonate and alumina as an absorbent for carbon dioxide, which reacts with the carbonate and water to form bicarbonate. The absorbent mixture is regenerated by mild heating, e.g. at 93° C. (200° F.). The presence of stoichiometric quantities of water is essential and the alumina appears to be regarded as essentially a mere carrier for the potassium carbonate. Other carbonates may be used.

U.S. Pat. No. 5,232,474 discloses a PSA process using alumina in 70–100% of the bed volume to remove water and carbon dioxide from air. Preference is expressed for alumina containing up to 10 wt. % silica as opposed to the generality of aluminas which typically contain only about 1% silica. Silica is an acidic material and the use of basic compounds to increase carbon dioxide capacity as proposed herein is therefore contrary to the teaching of this document.

BRIEF DESCRIPTION OF THE INVENTION

We have now found that treatment of alumina with a base without calcining to form alkali metal oxide can increase substantially the carbon dioxide adsorption capacity of the alumina that is regeneratable under PSA conditions.

Accordingly, the present invention provides a pressure swing adsorption process for absorbing carbon dioxide from a gas, comprising exposing the gas at a first pressure to an adsorbent to remove carbon dioxide from the gas and periodically regenerating said absorbent by reducing the pressure to which the absorbent is exposed to a pressure lower than said first pressure, wherein the adsorbent is formed by impregnating alumina with a basic solution having a pH of at least 9 and drying the adsorbent.

The beneficial effect of the treatment of the alumina with a basic solution may be due to the reaction of carbon dioxide with hydroxide ions in the basic environment of the alumina surface to form bicarbonate ions, although the applicant does not wish to be bound by this theory.

Preferably, the pH of the impregnating solution is at least 10, more preferably from 10 to 12. Best results have been obtained using an impregnating solution having a pH of about 11.

It is further preferred that the pH of the impreg-nating solution is related to the zero point charge (zpc) of the alumina according to the formula:

$$pH \geq zpc - 1.4$$

or more preferably by the formula:

$$zpc + 2 \geq pH \geq zpc - 1.4$$

Most preferably, the pH of the impregnating solution is related to the zero point charge of the alumina by the formula:

$$zpc + 1 \geq pH \geq zpc - 1$$

3

Said basic solution may suitably be a solution of an alkali metal or ammonium compound such as one selected from hydroxides, carbonates, bicarbonates, phosphates, and organic acid salts. Suitable basic compounds that may be employed include sodium, potassium or ammonium carbonate, hydroxide, bicarbonate, nitrate, formate, acetate, benzoate or citrate.

The most preferred basic compound for use in the invention is potassium carbonate.

The PSA process of the invention is preferably applied to the removal of carbon dioxide from gas streams in which it is present at a low level such as no more than 1000 ppm carbon dioxide prior to the adsorption process.

DETAILED DESCRIPTION OF THE INVENTION

A modified alumina for use in the invention may be prepared by making a solution of the chosen basic compound having an appropriate pH as described above and adding the solution to an alumina in a volume just sufficient to fill the pores of the alumina without producing surface wetness. The concentration and the amount of the solution may be chosen to produce a loading of the compound on the alumina of from 1 to 10% on a dry weight basis.

The treated alumina should be dried at a temperature which is not so high as to produce decomposition of the added compound to produce oxide which will bind carbon dioxide in a manner which cannot be reversed by reducing the gas pressure but only by elevated temperature, as in TSA. Thus U.S. Pat. No. 4,433,981 discloses treating alumina with a solution of sodium carbonate or other compounds, drying at 100° C., and then heat treating further at 575° C. This second heating step produces a material which is unsuitable for use in the PSA processes of this invention.

Preferably, the compound used to impregnate the alumina for use in the present invention does not cause water to react with the adsorbent so that it is not desorbed under the pressure swing conditions used. Non-reversible adsorption of water will progressively interfere with the adsorption of carbon dioxide. The use of materials of this type may be acceptable if water is removed first by an adsorbent in which it is reversibly adsorbed. We have found that non-reversible adsorption of water may be encountered if the compound with which the alumina is impregnated is a phosphate such as potassium phosphate.

Drying is therefore preferably carried out at below 200° C., more preferably below 150° C.

The invention will be further illustrated by the following examples. In the following examples, zero point charges of aluminas are measured by placing 20 grams of alumina in water and testing the pH after 24 hours. Henry's law constants ($K_2$) were measured as initial isotherm slopes in units of mmole/gram/atm after outgassing at a pressure of 50 microns for 16 hours at 25° C., followed by repeated dosing with $CO_2$ at 30° C. and subsequent evacuation at 50 microns pressure for 16 hours. Initial Henry's law constants ($K_1$) were measured similarly during the first dosing with $CO_2$. High $K_1$ values represent a larger capacity for adsorbing carbon dioxide in a manner that is not reversible by pressure swing but which may be reversible only by high temperature treatment. High $K_2$ values indicate the high regeneratable (by pressure swing) capacities desired for the present invention.

EXAMPLE 1

An activated alumina was impregnated with various solutions of differing pH. In each case, sufficient solution was added to just fill the pore volume of the alumina, the concentration of the solution being such as to produce a 5% by weight (solute/total weight of solids) loading of the solute on the alumina after drying at 120° C. Henry's law constants were then measured, giving the results shown in Table 1 below.

TABLE 1

| Adsorbent | pH of impregnating solution | (mmole/g/atm) $K_1$ | (mmole/g/atm) $K_2$ |
| --- | --- | --- | --- |
| Alcan AA-300 | —* | 14.8 | 5.6 |
| 5% $Fe(NO_3)_3$ | 1.2* | 1.3 | 1.2 |
| 5% Citric Acid | 1.7* | 0.92 | 0.88 |
| 5% CsI | 5.8* | 2.0 | 1.6 |
| 5% $NH_4HCO_3$ | 7.8* | 6.3 | 4.9 |
| 5% $(NH_4)_2CO_3$ | 8.9* | 6.6 | 5.8 |
| 5% $K_2CO_3$ | 11.4 | 81.0 | 22.8 |
| 5% $Na_3PO_4$ | 12.7 | 12.4 | 12.2 |
| 5% NaOH | 13.1 | 340 | 15.1 |

*Not in accordance with the invention.

The results in Table 1 clearly show that impregnation of alumina with acidic solutions reduces the $CO_2$ capacity of the material. In addition, basic solutions above a pH of 9 significantly increase the $K_2$ value for $CO_2$ indicating that making the surface of alumina more basic enhances $CO_2$ capacity.

EXAMPLE 2

This example demonstrates that the increase in adsorptive capacity we have obtained is dependent on pH and not merely the identity of the solute used. To show this, $K_2CO_3$ impregnating solutions were buffered to pH's of 13.8, 10.4 (the zpc of the Alcan AA-300) and 4. These solutions were used to make a 5 wt % impregnation by aqueous incipient wetness technique. $CO_2$ isotherms were then measured as described above at 30° C. Again the low pressure data was compared using the Henry's law constant. The results are shown in Table 2.

TABLE 2

| Solution pH | (mmole/g/atm) |
| --- | --- |
| $K_2CO_3$ adj to 13.8 | 6.3 |
| $K_2CO_3$ adj. to 10.41 | 10.8 |
| $K_2CO_3$ adj. to 4.0 | 0.6* |

*Not in accordance with the invention.

Clearly the acidic impregnated sample had its performance reduced, but the more basic solution also lost some performance when compared to the less basic solution (pH= 10.41). This unexpected result shows that the highest regenerable $CO_2$ capacity is achieved by using impregnations that are equal or slightly more basic than the natural zero point charge of the adsorbent alumina.

EXAMPLE 3

Aqueous solutions prepared from mixtures of various salts were prepared to make 5 wt % impregnations on Alcan AA-300 alumina. $CO_2$ isotherms were then measured on the samples as described above. The results of this testing is shown in Table 3.

TABLE 3

| Sample (all 5 wt %) | pH | (mmole/g/atm) $K_1$ | (mmole/g/atm) $K_2$ |
| --- | --- | --- | --- |
| Ammonium Bicarbonate/ammonium Formate | 7.78* | 2.7 | 2.1 |
| Ammonium Bicarbonate/Sodium Formate | 7.81* | 16.2 | 6.0 |
| Ammonium Bicarbonate/Potassium Carbonate | 9.0 | 49.2 | 13.2 |
| NaOH/Ammonium Bicarbonate | 11.19 | 223.5 | 27.3 |
| Sodium Carbonate | 11.4 | 188 | 12.4 |
| NaOH/Sodium Bicarbonate | 13.34 | 55.4 | 14.5 |
| NaOH/Sodium Formate | 13.58 | 349.3 | 11.1 |
| NaOH/Sodium Benzoate | 13.97 | 232.7 | 19.0 |

*Not in accordance with the invention.

The results in Table 3 show that regenerable $CO_2$ adsorption enhancement is achieved when the impregnation solution is of pH>9. This effect reaches a maximum around the natural ZPC of the alumina and starts to drop off with increasing pH's with a noticeable drop off with pH's>13.4. At these high pH's for the impregnating solution, the initial Henry's Law constant is quite high. However, after vacuum regeneration the large reduction in the measured Henry's Law constant shows that significant amounts of $CO_2$ adsorbed on the first pass are chemisorbed and not removable in a PSA application.

EXAMPLE 4

The utility of aluminas impregnated with basic salts was also tested by measuring $CO_2$ breakthrough curves. Breakthrough curves were measured in a 6 foot by 1 inch column with a feed gas stream of 400 ppm(v) $CO_2$ in air at an inlet pressure of 100 psig (689.5 kPa) and an adsorption temperature of 22° C. The feed flow rate was 27 lbmoles/t²/hr (131 kgmole/m²/hr). By simple mass balance on the column, the $CO_2$ capacity of different adsorbents and the $CO_2$ mass transfer zone length were determined. The results of the breakthrough measurements are given in Table 4.

TABLE 4

| Adsorbent | (mmole/g) $CO_2$ capacity | inches (cm) Mass Transfer Zone |
| --- | --- | --- |
| AA-300* | 0.11 | 14 (35.6) |
| 5% $K_2CO_3$ on AA-300 | 0.25 | 16 (40.6) |
| 5% $Na_3PO_4$ on AA-300 | 0.17 | 14 (35.6) |

*Not in accordance with the invention.

The results in Table 4 show that the $CO_2$ capacity from air on alumina impregnated with basic salts is greater than that of untreated alumina. In addition, this increased capacity is achieved without an increase in the mass transfer zone length needed for $CO_2$ adsorption.

EXAMPLE 5

The basic salt impregnated aluminas of Example 4 were tested in a single column PSA unit. The unit consisted of a single column 6 feet in length and 1 inch in diameter. The adsorbents were tested in a PSA cycle as follows:

(1) feed with air containing 400 ppm $CO_2$ at 22° C., 100 psig (689.5 kPa) and a flow rate of 28 standard liters per minute, (2) countercurrent depressurization to 10 psig (60 kPa), (3) purge with $N_2$ at 10 psig (69 kPa) and a flow rate of 15 standard liters per minute and (4) repressurization with $N_2$ to feed pressure. The total cycle time was twenty minutes with 9.8 minutes on feed and 9.8 minutes on purge. Table 5 gives the capacity of the three adsorbents noted in Table 4 under the identical cycles detailed above.

TABLE 5

| Adsorbent | (kg air treated/kg adsorbent/hr) Capacity |
| --- | --- |
| AA-330* | 3.54 |
| 5% $K_2CO_3$ on AA-300 | 3.87 |
| 5% $Na_3PO_4$ on AA-300 | 3.99 |

*Not in accordance with the invention.

The results exhibited in Table 5 show that impregnation of AA-300 alumina with basic salts increases the feed air capacity of the material 9 and 13%, respectively for $K_2CO_3$ and $Na_3PO_4$ impregnated adsorbents.

EXAMPLE 6

A sample of 5% $K_2CO_3$ impregnated alumina AA-300 was tested in a large scale PSA. The unit consists of a column 0.21 meters in diameter by 2 meters in length. PSA cycles were conducted with cycle steps noted above, but with 14 minutes on feed and 2 minutes for repressurization. The results of this testing is given in Table 6.

TABLE 6

| Feed Pressure | Molar Purge/Air Ratio | (kg air/kg/hr) AA-300 | (kg air/kg/hr) $K_2CO_3$ |
| --- | --- | --- | --- |
| 10 | 0.30 | 3.1 | 3.5 |
| 6 | 0.45 | 2.8 | 3.3 |

The results in Table 6 show that the alumina impregnated with $K_2CO_3$ can treat a larger amount of air than untreated alumina at the process conditions tested above. This means that for a given feed air flow rate, a smaller volume bed containing the impregnated alumina can be used versus untreated alumina. Under conditions of Example 5 and this example, the impregnated alumina requires from 10 to 15% less adsorbent than untreated alumina. This smaller adsorbent inventory and consequently lower bed volume is then translated into less switch loss on blowdown which increases the recovery and lowers the operating cost of the PSA.

Whilst the invention has been described with reference to preferred embodiments, it will be appreciated that many modifications and variations thereof are possible within the scope of the invention.

We claim:

1. A pressure swing adsorption process for absorbing carbon dioxide from a gas, comprising exposing the gas at a first pressure to an absorbent formed by impregnating alumina with a basic solution having a pH of 9 or more to remove carbon dioxide from the gas and periodically regenerating said absorbent by reducing the pressure to which the absorbent is exposed to a pressure lower than said first pressure.

2. A process as claimed in claim 1, wherein the pH of the impregnating solution is at least 10.

3. A process as claimed in claim 1, wherein the pH of the impregnating solution is from 10 to 12.

4. A process as claimed in claim 1, wherein the pH of the impregnating solution is about 11.

5. A process as claimed in claim 1, wherein the pH of the impregnating solution is related to the zero point charge of the alumina according to the formula:

$$pH \geq zpc - 1.4.$$

6. A process as claimed in claim 1 wherein the pH of the impregnating solution is related to the zero point charge of the alumina by the formula:

$$zpc + 2 \leq pH \geq zpc - 1.4.$$

7. A process as claimed in claim 1, wherein the pH of the impregnating solution is related to the zero point charge of the alumina by the formula:

$$zpc + 1 \leq pH \geq zpc - 1.$$

8. A process as claimed in claim 1, wherein said basic solution is a solution of an alkali metal or ammonium compound.

9. A process as claimed in claim 8, wherein said compound is selected from the group consisting of hydroxides, carbonates, bicarbonates, phosphates, and organic acid salts.

10. A process as claimed in claim 1, wherein the said gas contains up to 1000 ppm carbon dioxide prior to the adsorption process.

* * * * *